Aug. 5, 1969  M. A. FERGUSON  3,459,916
METHOD OF MACHINING AND HARDENING WORKPIECES WITH ELECTRICAL
DISCHARGE MACHINING APPARATUS
Filed Sept. 1, 1965
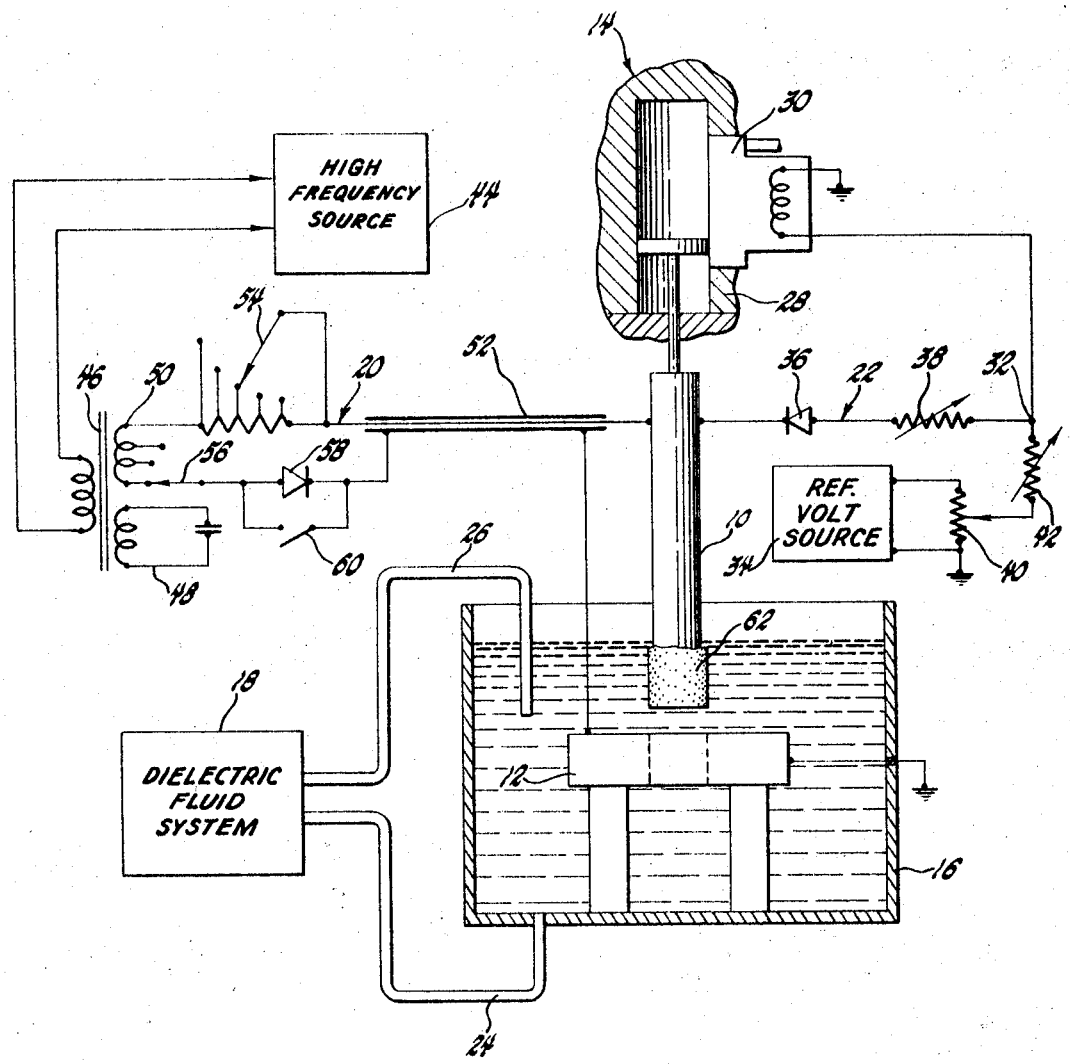
INVENTOR.
*Millard A. Ferguson*
BY
*Hugh L. Fisher*
ATTORNEY United States Patent Office 3,459,916
Patented Aug. 5, 1969

3,459,916
METHOD OF MACHINING AND HARDENING WORKPIECES WITH ELECTRICAL DISCHARGE MACHINING APPARATUS
Millard A. Ferguson, Utica, Mich., assignor to General Motors Corporation, Detroit, Mich., a corporation of Delaware
Filed Sept. 1, 1965, Ser. No. 484,305
Int. Cl. B23k 9/16
U.S. Cl. 219—69                            10 Claims

ABSTRACT OF THE DISCLOSURE

A method whereby a part is machined by the electrical discharge machining process and then the machined surfaces of the part are coated with an alloying material, after which the electrical discharge machining process is repeated to melt the alloying material and produce properly sized finished surfaces with a hard wear inhibiting coating.

---

This invention relates to the method of both machining and hardening workpieces with electrical discharge machining apparatus.

The making of various types of dies, such as piercing, cutting and stamping dies, usually involves machining the die to some desired shape and then either hardening the cutting edges of the die itself or suitably attaching to the die a hardened strip of material, which will serve as the cutting edge for the die. In either case a subsequent grinding step is required to properly size the cutting edge. Each step of these methods, therefore, requires a special machine tool as well as a skilled operator. Consequently, these methods are, as can be appreciated, not only time consuming but expensive.

Accordingly, a new and different method is proposed whereby electrical discharge machining apparatus is utilized both to machine a workpiece and facilitate the hardening. By the method, the workpiece is first machined by the electrical discharge machining process. The process is again repeated while exposing the machined surface to a substance including particles of an alloying material so as to melt the substance and produce a hard, wear inhibiting coating on the machined surface.

It is also contemplated that by the method both the cutting tool and the workpiece can be simultaneously machined and hardened.

The foregoing and other objects and advantages of the invention will be apparent from the following description and from the accompanying drawing in which the single figure illustrates electrical discharge machining apparatus that can be employed in carrying out the novel method.

The displayed electrical discharge machining apparatus includes a cutting tool 10 and a workpiece 12. Each serves in the usual way as an electrode and either or both can be maneuvered relative to the other. In this embodiment the cutting tool 10 is moved toward or away from the workpiece 12 by a feed mechanism, shown generally at 14. The workpiece 12 is mounted within and electrically isolated from a tank 16 to which is supplied a suitable dielectric fluid from a system, denoted generally at 18. The machining energy, derived from a power supply shown generally at 20, will produce electrical stock removing discharges across the dielectric fluid filled gap maintained between the cutting tool 10 and the workpiece 12. Maintenance of the gap spacing is a function of a gap spacing control, viewed generally at 22. The gap spacing control 22, as will be explained, controls the feed mechanism 14.

Any appropriate dielectric fluid system can be employed. The illustrated system 18 withdraws fluid from the tank 16 by way of an exhaust line 24. The fluid then is filtered by the system 18 and cooled, if necessary, before being returned to the tank 16 through a supply line 26.

The feed mechanism 14 and the gap spacing control 22 may be of the type illustrated in Patent No. 3,213,258, issued October 19, 1965, and entitled "Electrical Stock Removal Methods and Apparatus." Briefly, the mechanism 14 includes a piston type fluid pressure actuated motor 28. The supply of fluid pressure from a conventional source (not shown) for causing either feeding or retracting movement of the cutting tool 10 is controlled by a conventional force motor 30 in accordance with the error signals developed by the gap spacing control 22. Hence, an error signal of one polarity will energize the force motor 30 so as to cause, e.g., retracting movement by the motor 28; whereas an error signal of the opposite polarity will cause feeding movement.

The mentioned error signal is developed by comparing at a summing junction 32 a gap feedback voltage, which corresponds to the gap spacing with a reference voltage derived from a source 34. The feedback voltage is applied to the junction 32 through a rectifier 36, which converts the feedback voltage to a DC voltage, and a calibrating resistor 38. The reference voltage can be varied by an adjustable reference voltage resistor 40 and is applied to the summing junction 32 also through a calibrating resistor, assigned the numeral 42. The adjustments of the calibrating resistors 38 and 42 and the adjustable reference voltage reistor 40 determine, of course, the feed rate at which the feed mechanism 14 is to operate.

The power supply 20 may also be of the character shown and described in the mentioned Patent No. 3,213,257. With this type of power supply a high frequency AC source 44 is coupled through a transformer 46 to the gap. A tank circuit 48 is included and is adjusted so as to resonate at the source frequency and thereby provide energy storage for making supplemental energy available at all times and also for furnishing power factor compensation. The secondary winding 50 of the transformer 46 has the opposite ends thereof connected across the gap through a coaxial cable arrangement 52 and an adjustable current limiting resistor 54 that enables by the adjustment thereof the finish to be vried, e.g., increasing the resistance increases the roughness. An adjustable tap 56 permits the secondary winding voltage applied to the gap to be also varied.

Another feature of the power supply 20 is the selective use of a rectifier 58, which can be disabled by shunt switch 60 if desired. With the rectifier 58 connected in the circuit, the gap will be provided with a pulsating DC voltage. On the one hand, when the shunt switch 60 is closed the rectifier 58 is bypassed and an AC voltage is applied to the gap.

The operation of the apparatus will be explained as the method is described. Initially the method will be described when AC energy is used to both machine the cutting tool 10 and the workpiece 12 and also to harden each. Then the method will be described when using DC energy to machine and harden only the workpiece 12, or only the cutting tool 10 if wanted.

Preparatory to the machining of both the cutting tool 10 and the workpiece 12, the gap spacing control 22 is adjusted to provide the proper feed rate. This is done as explained by setting the adjustable reference voltage resistor 40. Also, the adjustable current limiting resistor 54 is set for the desired surface finish and the shunt switch 60 so that full AC energy is supplied to the gap.

In the illustrated embodiment the cutting tool 10 is provided with a carbon cutting tip 62. This carbon cutting tip 62 will do the bulk of the machining and during the process will be eroded. Hence, the dimensions of the tip 62 are selected so that the cutting tool 10 will have a final dimension that corresponds to that desired. By machining both the cutting tool 10 and the workpiece 12 simultaneously a die set comprising the punch, which would be the cutting tool 10, and the die, which would be the workpiece 12, can be formed. In the event that a carbon cutting tip is not employed, then the dimensions to which the cutting tool 10 is to be finally machined would determine how much excess material was left on the cutting tool 10.

The dielectric fluid system 18 is also turned on along with the power supply 20 so as to flow the dielectric fluid through the gap and the feed mechanism 14 is rendered operative. The electrical discharges that result will erode both the carbon rutting tip 62 and the workpiece 12 so that the workpiece 12 will have a hole formed therein of the size determined by the size and shape of the carbon cutting tip 62. During this machining the gap between the cutting tool 10 and the workpiece 12 will be continuously maintained at whatever the reference voltage source 34 is set; and if there is a deviation from this gap spacing, an error signal will be developed at the summing junction 32 and applied to the force motor 30. The feed mechanism 14, as has been explained, then will make the proper adjustment.

After the cutting tool and the workpiece 12 are machined, each to the desired dimension, the process is stopped and the dielectric fluid removed from the tank 16. The cutting tool 10 and the workpiece 12 are separated far enough so that the machined surfaces on each can be provided with a coating of a paste-like substance comprising particles of an alloying material, such as titanium or tungsten carbide, and a suitable liquid solvent, such as trichloroethylene. This solvent evaporates quickly and causes a coating of the particles to adhere to the machined surfaces.

Now the process is recommenced and the same AC voltage used during the machining is again applied across the gap. If a lower voltage is wanted the secondary winding tap 56 can be correspondingly adjusted. Also, if it is desired to alter the feed rate of the mechanism 14, this can be done by resetting the adjustable reference voltage resistor 40. With the cutting tool 10 again being fed into the workpiece 12, there is a sparking action across the gap such that the coating is melted as the cutting tool 10 proceeds into the workpiece 12 and each is provided with a hard, wear inhibiting surface that is a combination of a carbide and a nitride derived from the titanium or tungsten. The roughness of the surface can be varied in the same way as the machined surface; i.e., by adjusting the current limiting resistor 54, keeping in mind that the lower the resistance the rougher the finish.

As an alternative to the application of the paste-like substance to the machined surfaces, it is possible to use a properly contaminated dielectric which is flowed through the gap and across the machined surfaces during the hardening step. A relatively clean dielectric fluid would still be used for the machining step, but it would not be filtered but saved for the hardening step. If needed, contaminants could be added to the used dielectric fluid.

If only the workpiece is to be machined for some reason and the cutting tool 10 reused, the proper polarities are selected and these are determined by many factors, including the type of metals employed for the cutting tool and workpiece. If the usual polarities are employed the cutting tool 10 will be negative and the workpiece 12 positive. Hence, the shunt switch 60 in the power supply 20 will be opened so that the rectifier 58 provides the conversion to DC. The proper polarities can be provided either by the appropriate adjustment in any known way of the leads to transformer 46 or from the high frequency source 44. Again, the current limiting resistor 54 can be adjusted for the desired finish as well as the adjustable reference voltage resistor 40 for the preferred feed rate. The machining step will proceed as before except that now most of the stock is removed from the workpiece 12, keeping in mind that there usually is some wear of the cutting tool 10. Upon the completion of the machining of the workpiece 12 to the desired shape and dimension, the process is stopped by removing the power from the gap and withdrawing the cutting tool 10. The dielectric fluid within the tank 16 is withdrawn and the same substance mentioned before is applied only to the machined surface on the workpiece 12.

Power at the same voltage and polarity as used during the machining step can be again applied to the gap or it can be reduced, as the requirements vary, by the adjustment of the secondary winding tap 56. Also, as has been discussed, the feed rate can be altered by resetting the adjustable reference voltage resistor 40 and the roughness of the hardened layer varied by adjusting the current limiting resistor 54. After these adjustments are made the cutting tool 10 is again fed into the workpiece 12 to produce the melting and ultimately the development of the hardened layer on the machined surface of the workpiece 12. If only the cutting tool is to be hardened, the machining polarities are reversed; i.e., the workpiece 12 is made negative and the cutting tool 10 positive, assuming they had the previously mentioned conventional machining polarities. A suitable switching device (not shown) can be used for this polarity reversal or the appropriate leads can be reversed.

From the foregoing, it will be appreciated that by the novel method electrical discharge machining apparatus now can be utilized both to machine workpieces and also to provide surface hardening. Therefore, die sets can be made by electrical discharge machining and, subsequently, their cutting edges hardened by utilizing the same apparatus. One machine and one operator can make a complete die set.

The invention is to be limited only by the following claims.

What is claimed is:

1. A method of machining and hardening workpieces with electrical discharge machining apparatus comprising the steps of spatially positioning a workpiece and a cutting tool provided with a carbon cutting tip opposite each other in the apparatus so as to form a gap therebetween, supplying a dielectric fluid to the gap, supplying AC energy to the gap so as to generate electrical stock removing discharges thereacross for simultaneously machining the workpiece and the carbon cutting tip on the cutting tool, producing relative movement of the cutting tool and the workpiece in response to the voltage across the gap so as to maintain a predetermined gap therebetween and thereby machine a surface on the workpiece to a desired shape and also erode the carbon cutting tip on the cutting tool to provide the cutting tool with a surface of a desired dimension, interrupting the supply of both the AC energy and the dielectric fluid to the gap, applying a layer of a paste-like substance including particles of a metallic carbide to both the machined surface on the workpiece and the machined surface on the cutting tool, reinitiating the supply of AC energy to the gap, producing relative movement of the cutting tool and the workpiece in response to the voltage across the gap so as to maintain a certain gap therebetween and thereby produce a melting of the substance for forming a hard, wear inhibiting coating on both the machined surface on the workpiece and the surface on the cutting tool.

2. A method of machining and hardening workpieces with electrical discharge machining apparatus comprising the steps of spatially locating a workpiece and a cutting tool provided with a carbon cutting tip in the apparatus so as to form a gap therebetween, supplying a dielectric fluid to the gap, supplying AC energy to the gap while causing the cutting tool and the workpiece to be maneuvered relative to each other and together with a certain gap maintained therebetween so as to generate electrical stock removing discharges across the gap for simultaneously machining a surface on the workpiece to the desired shape and eroding the carbon cutting tip on the cutting tool to provide the cutting tool with a surface of a desired dimension, interrupting the supply of both the dielectric fluid and the AC energy to the gap, applying a layer of a paste-like substance including particles of an alloying material both to the machined surface on the workpiece and the surface on the cutting tool, supplying AC energy to the gap while again causing the cutting tool and the workpiece to be maneuvered relative to each other and together so as to melt the substance and causes a hard, wear inhibiting coating to be formed on both the machined surface on the workpiece and the surface on the cutting tool.

3. A method of manufacture utilizing electrical discharge machining apparatus comprising the steps of spatially locating a workpiece and a cutting tool in the apparatus so as to form a dielectric fluid-filled gap therebetween, supplying energy to the gap while producing relative movement of the cutting tool and the workpiece to maintain a predetermined gap therebetween so as to generate electrical stock removing discharges across the gap for simultaneously machining surfaces on the workpiece and the cutting tool, interrupting the supply of AC energy to the gap after the surfaces on the workpiece and the cutting tool are machined to desired shapes, applying a layer of a paste-like substance including particles of an alloying material to the machined surfaces on both the workpiece and the cutting tool, supplying energy to the gap while again producing relative movement of the cutting tool and the workpiece so as to melt the substance and cause a hard, wear inhibiting coating to be formed on the machined surfaces of the workpiece and the cutting tool.

4. A method of manufacture comprising the steps of spatially positioning conductive workpiece and cutting tool electrodes opposite each other in electrical discharge machining apparatus so as to form a gap therebetween, supplying pulsating energy to the gap while producing relative movement of the electrodes to maintain a predetermined gap therebetween so as to generate electrical stock removing discharges thereacross for machining a surface on the workpiece electrode, interrupting the supply of energy to the gap after the surface on the workpiece is machined to the desired shape, applying a layer of an adhering substance including particles of an alloying material to the machined surface on the workpiece electrode, supplying pulsating energy to the gap while again producing relative movement of the electrodes with a certain gap maintained therebetween so as to melt the substance and cause a hard, wear inhibiting coating to be formed on the machined surface of the workpiece electrode.

5. In a method of manufacture with electrical discharge machining apparatus utilizing cutting tool and workpiece electrodes spaced apart so as to form a machining gap therebetween, the steps comprising applying energy to the gap so as to machine the workpiece electrode, applying to the workpiece electrode gap area a substance including particles of an alloying material and reapplying energy of a selected polarity to the gap so that the particles are melted to form a hard, wear inhibiting layer on the workpiece electrode.

6. In a method of manufacture with electrical discharge machining apparatus utilizing cutting tool and workpiece electrodes spaced apart so as to form a machining gap therebetween, the steps comprising applying energy to the gap so as to machine one of the electrodes, supplying to the gap a substance including particles of an alloying material, and reapplying energy of a selected polarity to the gap so that the particles are melted to form a hard, wear inhibiting layer on a desired one of the electrodes.

7. A method of machining and hardening workpieces with electrical discharge machining apparatus comprising the steps of spatially positioning a workpiece and a cutting tool opposite each other in the apparatus so as to form a gap therebetween, supplying a dielectric fluid to the gap, supplying pulsating energy to the gap so as to generate electrical stock removing discharges thereacross for machining a surface on the workpiece, producing relative movement of the cutting tool and the workpiece together in response to the voltage across the gap so as to maintain a predetermined gap therebetween and thereby machine the surface on the workpiece to a desired shape, interrupting the supply of both the energy and the dielectric fluid to the gap, applying a layer of a paste-like substance including particles of a metallic carbide to the machined surface on the workpiece, reinitiating the supply of energy to the gap while again producing relative movement of the cutting tool and the workpiece together in response to the voltage across the gap so as to maintain a certain gap therebetween and thereby produce a melting of the substance for forming a hard, wear inhibiting coating on the workpiece machined surface.

8. A method of machining and hardening workpieces with electrical discharge machining apparatus comprising the steps of spatially locating a workpiece and a cutting tool in the apparatus so as to form a gap therebetween, supplying a dielectric fluid to the gap, supplying pulsating energy to the gap while causing the cutting tool and the workpiece to be maneuvered together with a certain gap maintained therebetween so as to generate electrical stock removing discharges across the gap for machining a surface on the workpiece, interrupting the supply of both the dielectric fluid and the pulsating energy to the gap after the surface on the workpiece has been machined to the desired shape, applying a layer of a paste-like substance including particles of an alloying material to the machined surface on the workpiece, supplying pulsating energy to the gap while again causing the cutting tool and the workpiece to be maneuvered relative to each other and together so as to melt the substance and cause a hard, wear inhibiting coating to be formed on the workpiece machined surface.

9. A method of manufacture utilizing an electrical discharge machining apparatus comprising the steps of spatially locating a workpiece and a cutting tool in the apparatus so as to form a dielectric fluid-filled gap therebetween, supplying energy to the gap while producing relative movement of the cutting tool and the workpiece to maintain a predetermined gap therebetween so as to generate electrical stock removing discharges across the gap for machining a surface on the workpiece, interrupting the supply of energy to the gap after the surface on the workpiece has been machined to a desired shape, applying a layer of a surface adhering substance including particles of an alloying material to the workpiece machined surface, supplying energy to the gap while again producing relative movement of the cutting tool and the workpiece so as to melt the substance and cause a hard, wear inhibiting coating to be formed on the workpiece machined surface.

10. A method of machining and hardening workpieces with electrical discharge machining apparatus, comprising the steps of spatially positioning a workpiece and a cutting tool opposite each other in the apparatus so as to form a gap therebetween, supplying a dielectric fluid to the gap, supplying energy to the gap while producing relative movement of the cutting tool and the workpiece to maintain a predetermined gap therebetween so as to generate electrical stock removing discharges across the gap for machining a surface on the workpiece, interrupting the supply of energy to the gap after the surface on the workpiece has been machined to a desired shape, supplying a contaminated dielectric fluid to the gap, and supplying energy to the gap while again producing relative movement of the cutting tool and the workpiece so as to cause contaminants in the dielectric fluid to melt and form a hard, wear inhibiting coating on the workpiece machined surface.

References Cited

UNITED STATES PATENTS

| | | |
|---|---|---|
| 3,385,947 | 5/1968 | Inoue. |
| 1,791,968 | 2/1931 | Morgan _____ 219—77 |
| 3,061,708 | 10/1962 | Pfau. |
| 3,194,938 | 7/1965 | Smith. |
| 3,240,914 | 3/1966 | Hill et al. |

ANTHONY BARTIS, Primary Examiner

R. F. STAUBLY, Assistant Examiner

PO-1050
(5/69)

UNITED STATES PATENT OFFICE
CERTIFICATE OF CORRECTION

Patent No. 3,459,916　　　　　　　　　　　Dated August 5, 1969

Inventor(s) Millard A. Ferguson

It is certified that error appears in the above-identified patent and that said Letters Patent are hereby corrected as shown below:

Column 1, line 32, delete "preperly" and substitute -- properly --.

Column 2, line 34, delete "reistor" and substitute -- resistor -- line 37, "Patent No. 3,213,257" should read -- Patent No. 3,213,258 --; line 48, change "vried" to -- varied --.

Column 3, line 24, change "rutting" to -- cutting --.

Column 5, line 1, change "mehtod" to -- method --; line 21, change "causes" to -- cause --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents